United States Patent [19]
Prillinger

[11] 3,917,037
[45] Nov. 4, 1975

[54] BRAKE SYSTEM
[75] Inventor: Peter F. M. Prillinger, Peoria Heights, Ill.
[73] Assignee: Caterpillar Tractor Co., Peoria, Ill.
[22] Filed: Nov. 11, 1974
[21] Appl. No.: 522,393

[52] U.S. Cl. ................................ 188/170; 303/9
[51] Int. Cl.² ........................................ F16D 65/24
[58] Field of Search ............ 188/170, 106 P, 106 R, 188/106 F; 303/2, 6 R, 9, 71

[56] References Cited
UNITED STATES PATENTS
| | | | |
|---|---|---|---|
| 3,090,359 | 5/1963 | Hoppenstand | 188/170 X |
| 3,463,276 | 8/1969 | Brooks | 188/170 X |
| 3,485,537 | 12/1969 | Schlor et al. | 303/9 |
| 3,547,234 | 12/1970 | Cummins | 188/170 |
| 3,791,492 | 2/1974 | Neilsen | 188/170 |

Primary Examiner—Duane A. Reger
Attorney, Agent, or Firm—Ralph E. Walters

[57] ABSTRACT

A brake system for stopping rotation of a pair of independently rotatable elements of a vehicle including a valve arrangement for controlling the application of a fluid applied brake and a spring applied, fluid released brake individually associated with the rotatable elements by simultaneously increasing fluid pressure to the fluid applied brake and decreasing fluid pressure to the spring applied, fluid released brake for stopping rotation of both rotatable elements.

15 Claims, 1 Drawing Figure

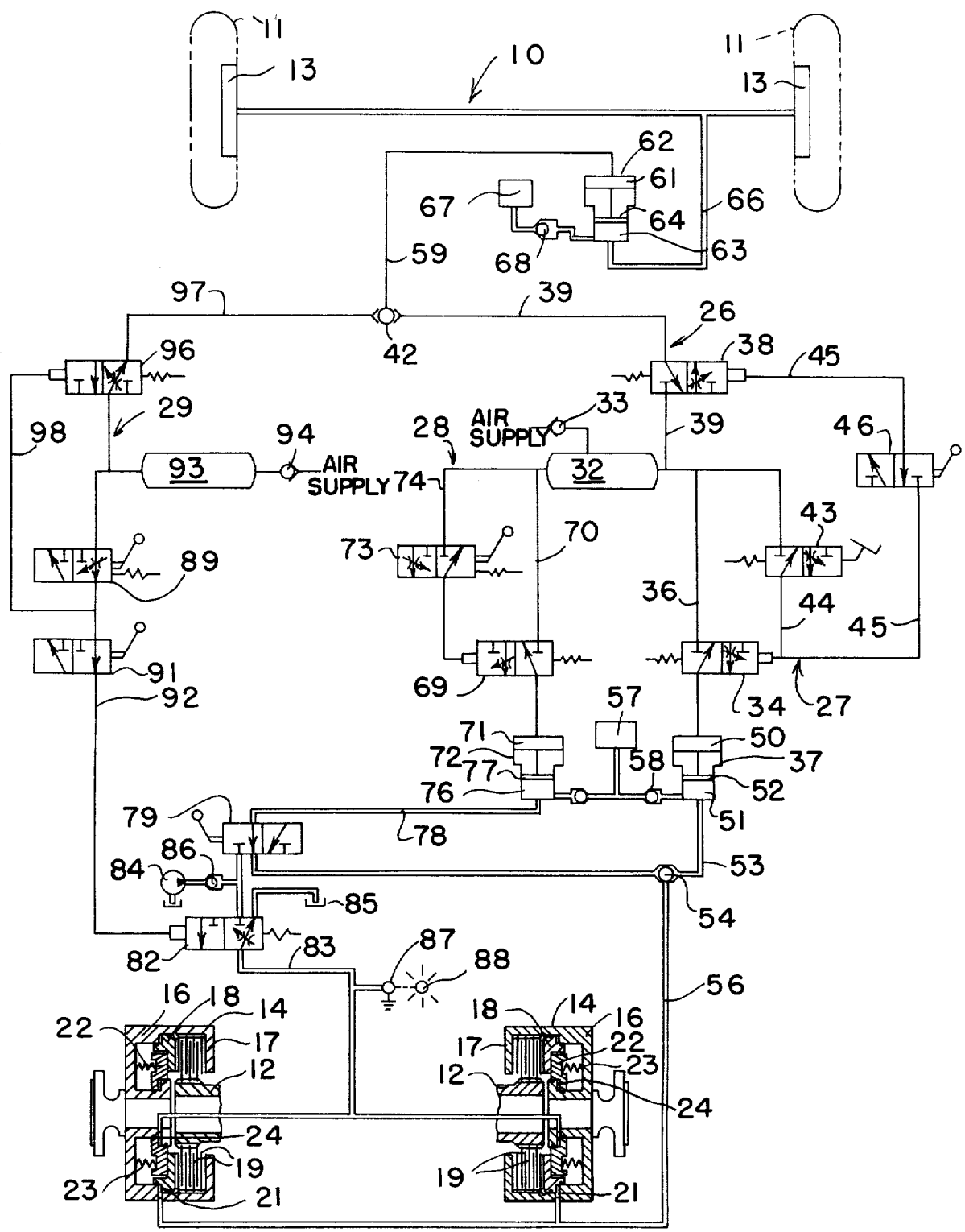

3,917,037

BRAKE SYSTEM

BACKGROUND OF THE INVENTION

A common form of vehicle service brake systems employs a master cylinder which may be operated to transmit a fluid pressure to individual brakes at each of the vehicle wheels for the purpose of applying the brakes. Heavy trucks, earthmoving vehicles and the like often have a pneumatic circuit for actuating the master cylinder or cylinders in response to manipulation of an operator's brake control. It is customary to supplement the service brake system with an emergency brake system which may be independent of or an integral part of the service brake system.

In many cases, the emergency brake is of the spring applied fluid released type for braking the rear wheels only. Such emergency brakes are generally automatically applied by the actuating springs upon loss of fluid pressure in the service brakes. While this is fundamentally a valuable safety measure it can also complicate the operator's task. If conditions permit, the operator would generally prefer to bring the vehicle to a more controlled emergency stop by modulated controllable braking rather than by suddenly having the brakes locked on and out of manual control. Furthermore, under certain conditions, it is desirable to be able simultaneously to actuate the emergency brake on the rear wheels along with the front service brakes for additional braking power. However, this has not heretofore been possible since the front brakes are applied by an increase in fluid pressure and the rear brakes are only applied by a loss of fluid pressure.

OBJECTS OF THE INVENTION

Accordingly, an object of this invention is to provide an improved brake system for stopping a vehicle.

Another object of this invention is to provide such an improved brake system which provides at least one brake device that is automatically applicable under certain conditions.

Another object of this invention is to provide an improved brake system of the character described which provides operater control over the actuation of the automatically applicable brake in combination with a separate brake device for simultaneous actuation of both devices.

Other objects and advantages of the present invention will become more readily apparent upon reference to the accompanying drawing and the following description.

BRIEF DESCRIPTION OF THE DRAWING

The sole FIGURE is a schematic drawing of a brake system embodying the principles of the present invention.

DESCRIPTION OF THE PREFERRED EMBODIMENT

Referring more particularly to the drawing, a brake system embodying the principles of the present invention is generally indicated by the reference numeral 10 in association with a pair of front wheels 11 of a vehicle, not shown, and a pair of rotatable shafts 12 each of which is operatively associated with a rear wheel, not shown, for such a vehicle. A pair of fluid applied front brake mechanisms 13 are individually operatively associated with the front wheels 11 for stopping rotation thereof in the usual manner. A pair of rear brake mechanisms 14 are individually associated with the rotatable shafts 12 for stopping rotation thereof when the brakes are applied.

Each of the rear brake mechanisms 14 includes a non-rotatable housing 16 having an end wall 17. A first annular piston 18 is disposed within the housing and adapted to clamp a plurality of alternately interleaved stationary and rotatable discs 19 against the end wall 17 for stopping rotation of the shaft 12. An actuating chamber 21 is formed between the first piston and the housing and is adapted to receive pressurized fluid to move the piston toward the end wall as will hereinafter be described. A second annular piston 22 is disposed within the housing and is resiliently urged into abutting engagement with the first piston by a plurality of springs 23 such that the discs are clamped against the end wall. An actuating chamber 24 is formed by the second piston and the housing and is adapted to receive fluid to move the second piston against the bias of the springs for freeing the first piston, which is retracted by return springs, not shown.

Actuation of the front and rear brake mechanisms 13 and 14 is controlled through a control system 26 having a service brake circuit 27, a retarder circuit 28, and an emergency brake and parking circuit 29. An air tank 32 is common to both the service brake circuit and the retarder circuit and stores pressurized fluid directed thereto through a check valve 33 from a compressor, now shown. The service brake circuit includes a first air actuated relay valve 34 disposed within a line 36 connecting the air tank with a master cylinder 37 and is normally resiliently positioned for blocking air flow through the line. A second air actuated relay valve 38 is disposed within a line 39 connecting the air tank with a double check valve 42 and is normally resiliently positioned for blocking air flow through the line. A manually controllable service brake valve 43 is disposed within a line 44 connecting the air tank with one end of the first relay valve 34 and is normally resiliently positioned for blocking flow of actuating air to the first relay valve. A branch line 45 connects the line 44 between valves 43 and 34 with one end of the second relay valve 38. A manually actuatable on-off valve 46 is disposed within the line 45 for controlling flow of actuating air to the second relay valve.

The master cylinder 37 is of the usual type having an air chamber 50 connected to the line 36 and a fluid chamber 51 separated from the air chamber by a stepped actuator piston 52. A conduit 53 connects the fluid chamber with a double check valve 54 which in turn is connected by a conduit 56 to the actuating chambers 21 of the rear brake mechanisms 14. The fluid chamber is also connected to a makeup tank 57 through a check valve 58.

A line 59 connects the check valve 42 with an air chamber 61 of a master cylinder 62. A fluid chamber 63 of the master cylinder is separated from the air chamber by a stepped piston 64 and is connected to the front brake mechanisms 13 through a conduit 66. A fluid makeup tank 67 is connected to the fluid chamber through a check valve 68.

The retarder circuit 28 includes an air actuated relay valve 69 disposed within a line 70 connecting the air tank 32 with an air chamber 71 of the master cylinder 72. A manually positionable control valve 73 is disposed within a line 74 connecting the air tank with one end of the relay valve 69. A fluid chamber 76 is separated from the air chamber by a stepped piston 77 and is connected to the double check valve 54 by a conduit 78 which has a two-piston manual towing valve 79 disposed therein. The towing valve is normally suitably retained in the position shown to permit fluid flow through the conduit 78 to the double check valve.

The emergency and parking brake circuit 29 includes an air actuated modulating valve 82 disposed within a conduit 83 connecting a pump 84 with the actuating chambers 24 of the brake mechanisms 14. The modulating valve is normally resiliently positioned to communicate the actuating chambers with a tank 85. A check valve 86 is disposed within the conduit 83 between the pump and the modulating valve. A normally closed pressure switch 87 is in communication with the conduit 83 and controls an electrical circuit to a warning light 88. A manual emergency valve 89 and a parking valve 91 are disposed in series within a line 92 which is connected to and transmits actuating air from an air tank 93 to one end of the modulating valve 82. The air tank receives pressurized air from the compressor, not shown, through a check valve 94. An air actuated inversion valve 96 is disposed within a line 97 connecting the air tank 93 with the double check valve 42 and is normally resiliently positioned to permit air flow therethrough. A line 98 is connected to the line 92 between the manual emergency valve and the parking brake valve and communicates actuating air from the manual emergency valve to one end of the inversion valve.

The relay valves 34, 38 and 69, the inversion valve 96, the service brake valve 43, the retarder valve 73, and the emergency brake valve 89 are of the type wherein air flow therethrough is selectively modulatable. Likewise the modulating valve 82 is constructed for modulating fluid flow therethrough.

OPERATION

While the operation of the present invention is believed clearly apparent from the foregoing description, further amplification will subsequently be made in the following brief summary of such operation. The air compressor and the pump 84 are driven by the vehicle engine in the usual manner such that the air tanks 32 and 93 are pressurized by the air compressor automatically after the engine is started and fluid from the pump is directed to the modulating valve 82. The valves 89 and 91 are normally in the position shown so that pressurized air is transmitted through line 92 to shift the modulating valve to a position for communicating the pump 84 with the chambers 24 of the brake mechanisms 14 through the conduit 83. The fluid in these chambers moves the second pistons 22 against the bias of the springs 23 and frees the first piston 18 for normal service brake operations.

Manually positioning the on-off valve 46 permits the operator to choose between service braking with the rear brake mechanisms 14 only or the combination of both front and rear brake mechanisms 13 and 14. With the valve 46 in the position shown, only the brake mechanisms 14 are employed for normal service braking which is initiated by manually positioning the service brake valve 43 for directing pressurized air to the end of the first relay valve 34. The first relay valve is in turn shifted to establish communication through line 36 to the air chamber 50 of the master cylinder 37. The pressurized air in the air chamber acts against the piston 52 which pressurizes the fluid in the fluid chamber 51 and directs such fluid through conduit 53, check valve 54 and conduit 56 to the chambers 21 of the rear brake mechanisms for moving the first pistons 18 toward the end walls 17 of the housings 16. The first pistons clamp the discs 19 against the end walls stopping rotation of the shafts 12 and thus the rear wheels. Releasing the service brake valve results in the air chamber 50 being vented to the atmosphere and releases the rear brake mechanisms.

Manually shifting the on-off valve 46 to establish communication through the line 45 results in the simultaneous shifting of both the first and second relay valves 34 and 38, respectively when the service brake valve 43 is manually shifted. Shifting valve 34 causes the rear brake mechanisms 14 to be applied as previously described while shifting the relay valve 38 directs pressurized air through line 39, double check valve 42, and line 59 to the air chamber 61 of the master cylinder 62. This pressurizes the fluid in the fluid chamber 63 with the fluid being directed to the front brake mechanisms 13 thereby stopping rotation of the wheels 11. Thus, with the on-off valve shifted both brake mechanisms 13 and 14 are applied simultaneously.

Considering now the retarding mode of braking, the control valve 73 is manually shifted to direct pressurized air to the end of the relay valve 69 which in turn is shifted to communicate pressurized air to the air chamber 71 of the master cylinder 72. The control valve 73 is preferably frictionally retarded or detented so that it can be positioned in predetermined increments for precisely controlling the air flow directed to the relay valve and thus to the master cylinder. The air pressure in the air chamber results in pressurization of the fluid in the fluid chamber 76 with the fluid being directed through the conduit 78, the normally open towing valve 79, the double check valve 54, conduit 56 and into the actuating chambers 21 of the rear brake mechanisms 14. The fluid in the actuating chambers moves the first pistons 18 against the discs 19 an amount proportional to the air pressure in the air chamber 71 of the master cylinder. Thus the rear brake mechanisms are applied for the purpose of controlling vehicle speed while traveling down a slope. Returning the control valve 73 to the position shown releases the brake mechanisms to permit rotation of the shafts 12.

The manually controlled emergency braking mode of operation is initiated by manually shifting the manual emergency valve 89 simultaneously to block flow of pressurized actuating air through lines 92 and 98 permitting the modulating valve 82 and the inversion valve 96 to be resiliently shifted toward their normal position. Shifting the modulating valve towards its normal position results in blocking fluid flow from the pump 84 while modulating the exhausting of fluid from the chambers 24 of the brake mechanisms 14. This permits the spring 23 to move the second pistons 22 against the first pistons 18 which clamp the discs 19 against the end plates 17 for stopping rotation of the shafts 12. The shifting of the inversion valve 96 toward its normal position by reducing actuating air pressure thereto results in pressurized air being modulatably directed through line 97, the double check valve 42, line 59, and into the air chamber 61 of the master cylinder 62. This causes pressurized fluid to be directed through the conduit 66 to apply the front brake mechanisms 13 for stopping rotation of the front wheels 11. Thus, both brake mechanisms 13 and 14 are applied simultaneously through the shifting of the manual emergency valve 89.

The rear brake mechanisms 14 may be used as a parking brake by manually shifting the parking brake valve 91. This vents the conduit 92 permitting the modulation valve 82 to shift to a position blocking fluid flow from the pump 84 while exhausting the actuating chambers 24 through the conduit 83. This causes the springs 23 to move the second pistons 22 against the first pistons 18 which in turn clamp the discs 19 against the end plates 17 for preventing rotation of the shafts 12.

Although the brake system 10 is arranged to minimize the probability of the rear brake mechanisms 14 being suddenly applied and out of control of the operator, the rear brake mechanisms are automatically applied under certain conditions for safety reasons. For example, a loss of pressurized fluid from conduit 83 results in automatic application of the rear brake mechanisms. Likewise, a sudden loss of air pressure in the conduit 92 permits the modulating valve 82 to shift to block fluid flow from the pump while exhausting the fluid from chambers 24 and conduit 83 permitting the springs 23 to apply the rear brake mechanisms.

The towing valve 79 is included to provide an alternate source of pressurized fluid for releasing the rear brake mechanisms 14 when fluid pressure is not available from the pump 84 such as when the engine is inoperative. Of course, the towing mode of operation is dependent upon having pressurized air in the air tanks 32 and 93. In some cases sufficient air pressure may remain in the air tanks for the towing operations while in other cases it may be necessary to connect the air tanks to the air system of the towing vehicle. With air pressure in tank 93, the modulating valve 82 is shifted to permit fluid flow through conduit 83. The towing mode is initiated by shifting the towing valve 79 to connect the conduit 78 to the conduit 83. The control valve 73 of the retarder circuit 28 is then manually shifted to direct actuating air to shift the relay valve 69 which in turn causes pressurized air to be directed to the air chamber 71. This results in pressurized fluid from the fluid chamber 76 being directed through conduit 78, towing valve 79, conduit 83 and into the chambers 24. The pressurized fluid in the chambers moves the second pistons against the bias of the springs 23 to release the clamping force on the discs 19. While the vehicle is being towed, both brake mechanisms 13 and 14 can be applied to stop the vehicle by actuation of the valve 89 as previously described.

In view of the foregoing it is readily apparent that the structure of the present invention provides an improved brake system which provides for the simultaneous application of a fluid applied brake and a spring applied fluid released brake by the manual manipulation of a single control valve. This is accomplished by providing an air actuated modulating valve for controlling fluid flow to the spring applied fluid released brake and an air actuated inversion valve for controlling fluid flow to the fluid applied brake. Reducing the flow of actuation air to the modulating valve causes it to shift toward a position for blocking fluid flow therethrough for supplying the spring applied released brake while reducing the flow of actuating air to the inversion valve causes it to shift toward a position for directing pressurized fluid to apply the fluid applied brake. Thus, by controlling the flow of actuating air to the modulating and inversion valves by a single control valve, both brakes are actuated simultaneously. Also, the spring applied fluid released brake is always available for automatic emergency braking when fluid pressure is lost from the system. Furthermore, the spring applied fluid released brake may be independent of or an integral part of a service brake mechanism with the spring applied fluid release brake providing an emergency brake system to supplement the service brake system.

While the invention has been described and shown with particular reference to the preferred embodiment, it will be apparent that variations might be possible that would fall within the scope of the present invention which is not intended to be limited except as defined in the following claims.

What is claimed is:

1. A brake system for stopping rotation of a pair of independently rotatable elements of a vehicle, comprising;

fluid applied brake means operatively associated with one of said rotatable elements;

spring applied, fluid released brake means operatively associated with the other of said rotatable elements;

apparatus means for providing pressurized fluid;

conduit means connecting said apparatus means to both of said brake means; and valve means disposed in said conduit means and normally positioned to direct said pressurized fluid to said spring applied fluid released brake means while blocking fluid flow therethrough to the fluid applied brake means for releasing both of said brake means permitting unrestricted rotation of said elements, said valve means being selectively positionable simultaneously to block fluid flow therethrough to said spring applied fluid released brake means and to direct pressurized fluid to said fluid applied brake means so that both of said brake means are applied at the same time for stopping rotation of said rotatable elements.

2. The brake system of claim 1 wherein said valve means includes a manual control valve selectively positionable for blocking said pressurized fluid from said spring applied fluid released brake means, and a fluid actuated inversion valve positioned to direct said pressurized fluid to said fluid applied brake means in response to the blocking of pressurized fluid to the spring applied fluid released brake means.

3. The brake system of claim 2 wherein said apparatus means includes a hydraulic pump for supplying pressurized hydraulic fluid to said spring applied fluid released brake means through said conduit means, and including a fluid actuated modulating valve positioned in response to pressurized fluid directed thereto from said manual control valve to direct said hydraulic fluid to the spring applied fluid released brake means and positioned in response to the blocking of said pressurized fluid thereto from said manual control valve to block hydraulic fluid from said spring applied fluid released brake means.

4. The brake system of claim 3 wherein said apparatus means includes a tank of compressed air and wherein said pressurized fluid directed through said manual control valve for shifting the inversion and modulating valves is pressurized air and said pressurized fluid directed through said inversion valve is pressurized air.

5. The brake system of claim 4 including a master cylinder having a fluid chamber, and actuator means for generating fluid pressure in said fluid chamber in response to pressurized air directed to said master cylinder, said conduit means includes a conduit connecting said fluid chamber with said fluid applied brake means.

6. The brake system of claim 5 including second fluid applied brake means operatively associated with said other rotatable element, and means for directing presurized fluid to said second brake means for application thereof.

7. The brake system of claim 6 wherein said fluid directing means includes a tank of compressed air, a master cylinder having a fluid chamber and actuator means for generating fluid pressure in said fluid chamber in response to pressurized air directed to said master cylinder, a fluid conduit connecting said fluid chamber to said second brake means, an air conduit connecting said tank with said master cylinder and valve means disposed in said air conduit for controlling flow of pressurized air to said master cylinder.

8. The brake system of claim 7 including a towing valve disposed in said fluid conduit having a position permitting fluid flow from said fluid chamber to said second fluid applied brake means, said towing valve being selectively positionable to direct pressurized fluid from said fluid chamber through said conduit means to release said spring applied fluid released brake means when said hydraulic pump is inoperative.

9. A brake system for stopping rotation of a rotatable member comprising;
a spring applied hydraulically released brake operatively associated with such rotatable member;
pump means for generating hydraulic fluid pressure;
a fluid conduit communicating said pump with said brake means;
an air actuated modulating valve disposed in said fluid conduit for controlling fluid flow therethrough, said modulating valve normally positioned for blocking fluid flow through said fluid conduit;
a tank of compressed air;
air conduit means communicating said tank with said modulating valve; and
a manual control valve disposed in said air conduit means and normally positioned to direct pressurized air through said air conduit means to actuate said modulating valve to a position to direct pressurized fluid to said brake means for releasing said brake means, said manual control valve being selectively positionable modulatably to reduce air flow through said air conduit means for shifting the modulating valve toward the normal fluid blocking position to modulatably reduce fluid flow to the brake means for applying said brake means for stopping rotation of the rotatable member.

10. The brake system of claim 9 including a fluid applied brake operatively associated with the rotatable member,
a pair of master cylinders each having a fluid chamber and actuator means for generating fluid pressure in said fluid chamber in response to pressurized air directed to said master cylinders,
fluid conduit means communicating said fluid chambers with said fluid applied brakes,
a check valve disposed in said conduit means and operative to communicate pressurized fluid to the fluid applied brake from the fluid chamber which has the highest fluid pressure therein while blocking direct communication between the fluid chambers,
air conduit means connecting said tank with said master cylinders,
service valve means disposed in said air conduit means for controlling flow of pressurized air from said tank to one of said master cylinders for controlling actuation of said fluid applied brakes, and
retarder valve means disposed in said air conduit means in parallel to said service valve means for controlling flow of pressurized air from the tank to the other of said master cylinders for providing a second method of actuating the fluid applied brakes.

11. The brake system of claim 10 wherein the rotatable member is a wheel of a vehicle and including a control valve disposed in said fluid conduit means and selectively positionable to connect said fluid conduit means to said fluid conduit for providing a second source of pressurized fluid to release said spring applied fluid released brake to permit the vehicle to be towed when said pump means is inoperative.

12. A brake system for a vehicle comprising;
a first source of pressurized fluid;
a spring applied fluid released brake which is automatically applied in the absence of actuating fluid thereto,
a fluid conduit connecting said first source of pressurized fluid to said spring applied fluid released brake;
valve means disposed in said fluid conduit and having a position for directing pressurized fluid to said spring applied fluid released brake releasing said spring applied fluid released brake, said valve means being selectively positionable to block fluid flow to said spring applied released brake;
a second source of pressurized fluid;
a fluid applied brake;
conduit means connecting said second source of pressurized fluid to said fluid applied brake;
valve means disposed in said conduit means for controlling flow of pressurized fluid therethrough and selectively positionable to direct pressurized fluid through said conduit means to apply said fluid applied brake; and
a towing valve disposed in said conduit means having a first position for communicating said pressurized fluid from said second source of pressurized fluid to said fluid applied brake and selectively positionable to connect said conduit means to said fluid conduit for communicating said pressurized fluid from said second source of pressurized fluid to said spring applied fluid released brake for releasing said spring applied fluid released brake to permit the vehicle to be towed in the absence of pressurized fluid from first source of pressurized fluid.

13. The brake system of claim 12 wherein said first source of pressurized fluid is a hydraulic pump.

14. The brake system of claim 13 wherein said second source of pressurized fluid includes a tank of compressed air and a master cylinder having a fluid chamber and actuator means for generating fluid pressure in said fluid chamber in response to pressurized air directed to said master cylinder, said conduit means include a fluid conduit connecting said fluid chamber with said fluid applied brake, and an air conduit connecting said tank of compressed air with said master cylinder, said valve means being disposed in said air conduit with said towing valve being disposed in said fluid conduit.

15. The brake system of claim 14 wherein said valve means includes an air actuated relay valve disposed within said air conduit, an air line connected to said tank of compressed air for delivering actuating air to said relay valve, and a manual control valve disposed in said air line selectively positionable for controlling flow of pressurized air through said line for actuating said relay valve.

* * * * *

Disclaimer 3,917,037.—*Peter F. M. Prillinger*, Peoria Heights, Ill. BRAKE SYSTEM. Patent dated Nov. 4, 1975. Disclaimer filed Dec. 1, 1977, by the assignee, *Caterpillar Tractor Co.*

Hereby enters this disclaimer to claim 1 of said patent.

[*Official Gazette March 14, 1978.*]